United States Patent Office
3,518,262
Patented June 30, 1970

3,518,262
DIORGANO-AMINOMETHYLPHOSPHINE SULFIDES AND PROCESS
Ludwig Maier, Zurich, Switzerland, assignor to Monsanto Company, St. Louis, Mo., a corporation of Delaware
No Drawing. Filed Aug. 12, 1966, Ser. No. 571,964
Int. Cl. C07d 87/46
U.S. Cl. 260—247.1
8 Claims

ABSTRACT OF THE DISCLOSURE

Diorganoaminomethylphosphine sulfides of the formula $R^1R^2(R^3R^4NCH_2)PS$ wherein $R^1$ and $R^2$ are alkyl groups of up to 4 carbon atoms or phenyl, $R^3$ and $R^4$ are selected from the group consisting of alkyl groups of up to 4 carbon atoms, phenyl, dodecyl, alkenyl groups of up to 4 carbon atoms, or $R^3$ and $R^4$ taken together with the associated nitrogen atom are selected from the group consisting of piperidinyl, pyrrolidinyl or morpholinyl, and provided $R^4$ can be a hydrogen atom, which compounds are useful as oil and gasoline additives and heat transfer fluids and are exemplified by diphenyl-diethylaminomethylphosphine sulfide, di - isobutyl - piperidinomethylphosphine sulfide and diethyldiarylaminomethylphosphine sulfide.

The present invention relates to novel diorganoaminomethylphosphine sulfides of the general formula $$R^1R^2(R^3R^4NCH_2)PS$$

in which $R^1$ to $R^4$ signify identical or different, possibly halogenated and/or olefinically or acetylenically unsaturated alkyl, cycloalkyl, aralkyl, alkaryl, aryl, i.e. hydrocarbyl, or heterocyclic radicals, or $R^1$ and $R^2$ or $R^3$ and $R^4$, respectively, when taken together with the nitrogen atom or phosphorus atom, respectively, a heterocyclic radical, and $R^4$ moreover also a hydrogen atom, and to a process for preparing these compounds. Normally the R groups will have not more than 24 carbon atoms.

The compounds formulated above represent a novel class of useful compounds and their preparation has not been described hitherto, as is evident from a review which has recently been issued (Topics in Phosphorus Chemistry, vol. 2, page 45, 1965). It has been found that these compounds can be prepared by reacting a secondary phosphine sulfide with formaldehyde and a primary or secondary amine according to the equation

Instead of formaldehyde and the amine one can also use the respective methylolamine, which is an intermediate in the reaction.

Examples of organic radicals $R^1$ to $R^4$ are: alkyls, alkenyls and alkynyls like methyl, ethyl, n-propyl, isopropyl, allyl, propargyl, n-butyl, iso-butyl, sec-butyl, tert-butyl, methallyl, crotyl, 2-butynyl and higher aliphatic groups having up to 24 carbon atoms like undecenyl, dodecyl, myristyl, oleyl, tetracosyl; moreover cycloalkyls and cycloalkenyls like cyclopentyl, cyclopentenyl, cyclopentadienyl, cyclohexyl, cyclohexenyl, cyclohexadienyl and greater alicyclic groups having up to 12 carbon atoms like cyclooctyl, cyclooctatrienyl, cyclododecyl, cyclododecatrienyl, bicyclohexyl; moreover aralkyls, aralkenyls and aralkynyls like benzyl, cuminyl, phenylethyl, phenylpropyl, 3-phenylallyl, 2-phenylallyl, cinnamyl, diphenylmethyl, triphenylmethyl, 1-naphthylmethyl, 2-naphthylmethyl, 1-naphthylethyl, 2-napthylethyl; moreover alkaryls, alkenylaryls and alkynylaryls like tolyl, xylyl, mesityl, duryl, ethylphenyl, cumyl, vinylphenyl, ethynyl-phenyl, propargylphenyl, propynylphenyl, tert-butylphenyl, 1-vinylnaphthyl, 2-vinylnaphthyl, 1-ethynylnaphthyl, 2-ethylnaphthyl; moreover aryls like phenyl, o-biphenylyl, m-biphenylyl, p-biphenylyl, o-terphenylyl, m-terphenylyl, p-terphenylyl, 1-naphtyl, 2-naphthyl, 2-anthryl, 9-anthryl, 1-phenanthryl, 2-phenanthryl, 3-phenanthryl, 4-phenanthryl, 9-phenanthryl; moreover heterocyclic groups like furyl, thienyl, thiazolyl, oxazolyl, isooxazolyl, pyridyl, pyranyl, thiopyranyl, pyrazinyl, pyrimidyl, pyridazinyl, triazinyl, and moreover also groups such as pyrryl, pyrrolinyl, pyrazolyl, imidazolyl, piperidyl, piperazinyl, morpholinyl etc. if their NH-group is substituted.

From the equation shown above it is apparent that the secondary phosphine sulfide can contain also a combination of the enumerated hydrocarbon groups. Such starting compounds are well-known. However, the reaction of invention cannot be extended to the primary phosphine sulfides. The cyclic phosphine sulfides, of which are cited tetramethylenephosphine sulfide and pentamethylenephosphine sulfide as simple examples, are included.

From the structural formula it further can be seen that the group $R^3R^4N$ represents the radical of a primary or secondary amine and also may contain a combination of the cited hydrocarbon groups. The groups derived from a secondary heterocyclic amine, such as ethylene imine, propylene imine, pyrrole, pyrroline, pyrrolidine, pyrazole, pyrazoline, N - methylpyrazoline, imidazole, imidazoline, N-ethylimidazolidine, thiazolidine, oxazolidine, triazole, piperidine, N-dodecylpiperazine, morpholine, thiazine, indole and carbazole, are included.

On carrying out the process a secondary phosphine sulfide e.g. diphenylphosphne sulfide, is brought to reaction with formaldehyde and a primary or secondary amine, e.g. methylamine or dimethylamine, in a molar ratio of about 1:1:1. The reaction can be carried out with or without a solvent. However, one can add any other inert solvent.

Suitable solvents are water, methyl alcohol, ethyl alcohol, iso-propyl alcohol, acetonitrile, dioxan, dimethylacetamide, dimethylsulfone, dimethylsulfoxide, sulfolan, tetrahydrofuran, hexane, benzene and toluene. The formaldehyde can be used in the form of the commercial aqueous solution or paraformaldehyde. The reaction medium may consist also of two layers, the one being water and the other an inert organic solvent which is not miscible with water. In general, the exothermic reaction proceeds at room temperature. One can prepare at first the reaction product of formaldehyde and secondary amine and, possibly after a preceding purification, bring it to condensation with the secondary phosphine sulfide.

The endproducts can be extracted from the aqueous solution with an appropriate solvent, e.g. with benzene. One can also distill off the organic solvent or the water and obtain a crude product which is directly utilizable for many purposes. Some endproducts can be distilled under reduced pressure.

The novel compounds are useful as additives for oils, lubricants and gasoline, as heat transfer fluids, and as herbicides, especially contact herbicides.

EXAMPLE 1

To 2.2 g. (0.03 mole) of diethylamine and 2.7 ml. (0.03 mole) of aqueous formaldehyde (40% solution) is added dropwise 6.6 g. (0.03 mole) of diphenylphosphine sulfide. After the exothermic reaction is complete, one adds 50 ml. of water and extracts 3 times with 50 ml. portions of benzene. The benzene solution is dried and distilled.

Yield 8.3 g. (91.2%) of diphenyl-diethylamino-methylphosphine sulfide.

*Analysis.*—Calc'd for $C_{17}H_{22}NSP$ (303.35), percent: C, 67.29; H, 7.31; N, 4.62. Found, percent: C, 67.22; H, 7.24; N, 5.44.

EXAMPLE 2

A mixture of 0.824 g. (4.6 mmole) of di-iso-butylphosphine sulfide, 0.370 g. (4.5 mmole) of aqueous formaldehyde (38% solution) and 0.394 g. (4.6 mole) of piperidine is heated at 40 to 50° C. for about half an hour, then extracted 3 times with benzene, the benzene solution separated, dried and the benzene distilled off. The residue is an oil which upon fractional distillation yields pure di-iso-butyl-piperidinomethylphosphine sulfide; B.P. 140° C./0.01 mm.

*Analysis.*—Calc'd for $C_{14}H_{30}PSN$ (275.4), percent: N, 5.08; S, 11.64. Found, percent: N, 4.63; S, 12.40.

EXAMPLE 3

A mixture of 6 g. (0.0276 mole) of diphenylphosphine sulfide, 2.24 g. (0.0276 mole) of aqueous formaldehyde (38% solution) and 2.4 g. (0.0276 mole)of morpholine is stirred at room temperature for half an hour, then extracted with benzene, the benzene solution separated, dried and the benzene distilled off. The residue is a yellow oil which crystallizes on stirring with some ether.

Yield 7.5 g. (90%) of diphenyl-morpholinomethylphosphine sulfide; M.P. 97–98° C. (from ether).

*Analysis.*—Calc'd for $C_{17}H_{20}NOPS$ (317.4), percent: C, 64.33; H, 6.35; N, 4.41. Found, percent: C, 65.18; H, 6.30; N, 4.28.

EXAMPLE 4

A mixture of 6 g. (0.0276 mole) of diphenylphosphine sulfide, 2.24 g. (0.0276 mole) of aqueous formaldehyde (38% solution) and 1.96 g. (0.0276 mole) of pyrrolidine is heated at 50° C. for 45 minutes, then 20 ml. of water is added, extracted with benzene, the benzene solution separated, dried and the benzene distilled off. The residue yellow oil crystallizes on stirring with some ether.

Yield 7.9 g. (100%) of diphenyl-pyrrolidinomethylphosphine sulfide; M.P. 82–83° C. (from ether).

*Analysis.*—Calc'd for $C_{17}H_{20}NPS$ (301.4), percent: C, 67.74; H, 6.68; N, 4.64. Found, percent: C, 68.56; H, 7.04; N, 4.76.

EXAMPLE 5

A mixture of 5.45 g. (0.025 mole) of diphenylphosphine sulfide, 2.02 g. (0.025 mole) of aqueous formaldehyde (37% solution) and 2.12 g. (0.025 mole) of piperidine is heated at 50° C. for 30 minutes, then extracted 3 times with benzene, the benzene solution separated, dried and the benzene distilled off. The residue is a solid.

Yield 7.85 g. (100%) of diphenyl-piperidinomethylphosphine sulfide; M.P. 75–76° C. (from ether).

*Analysis* (315.4).—Calc'd, percent: N, 4.43; P, 9.81. Found, percent: N, 4.99; P, 10.05.

EXAMPLE 6

A mixture of 2.5 g. (0.0202 mole) of diethylphosphine sulfide, 1.66 g. (0.0202 mole) of aqueous formaldehyde (37% solution) and 1.98 g. (0.0202 mole) of diallylamine reacts exothermically and the temperature rises to 55° C. After reaction completion the mixture is extracted with benzene and the benzene extract fractionally distilled. One obtains after a forerun (1 g., B.P. 60–100° C./0.01 mm. Hg) also 3.2 g. (69%) of diethyl-diallylaminomethylphosphine sulfide; B.P. 100–105° C./0.01 mm. Hg.

*Analysis* (231.2).—Calc'd, percent: N, 6.05. Found, percent: N, 5.62.

EXAMPLE 7

A mixture of 2.5 g. (0.0202 mole) of diethylphosphine sulfide, 1.66 g. (0.0202 mole) of aqueous formaldehyde (37% solution) and 7.22 g. (0.0202 mole) of didodecylamine is heated at 50° C. for 30 minutes and then extracted with benzene. Upon distillation of the benzene there remain 10 g. of oil, giving 6.5 g. (65%) pure diethyldidodecylaminomethylphosphine sulfide; B.P. 150–160° C./0.001 mm. Hg (partial decomposition), on redistillation.

What is claimed is:

1. A diorgano-aminomethylphosphine sulfide of the formula $$R^1R^2(R^3R^4NCH_2)PS$$

wherein $R^1$ and $R^2$ are alkyl groups of up to 4 carbon atoms or phenyl, $R^3$ and $R^4$ are selected from the group consisting of alkyl groups of up to 4 carbon atoms, phenyl, dodecyl, alkenyl groups of up to 4 carbon atoms, or $R^3$ and $R^4$ taken together with their associated nitrogen atom are selected from the group consisting of piperidinyl, pyrrolidinyl or morpholinyl, and provided $R^4$ can be a hydrogen atom.

2. A phosphine sulfide of claim 1 wherein $R^1$ and $R^2$ are each phenyl and $R^3$ and $R^4$ are each ethyl.

3. A phosphine sulfide of claim 1 wherein $R^1$ and $R^2$ are each isobutyl and $R^3$ and $R^4$ are taken together with the nitrogen atom to which they are attached to form a piperidinyl group.

4. A phosphine sulfide of claim 1 wherein $R^1$ and $R^2$ are each phenyl and $R^3$ and $R^4$ taken together with the nitrogen atom to which they are attached and an oxygen atom form a morpholinyl group.

5. A phosphine sulfide of claim 1 wherein $R^1$ and $R^2$ are each phenyl and $R^3$ and $R^4$ taken together with their nitrogen atom form a pyrrolidinyl group.

6. A phosphine sulfide of claim 1 wherein $R^1$ and $R^2$ are each phenyl and $R^3$ and $R^4$ taken together with their nitrogen atom form a piperidinyl group.

7. A phosphine sulfide of claim 1 wherein $R^1$ and $R^2$ are each ethyl and $R^3$ and $R^4$ are each allyl.

8. A phosphine sulfide of claim 1 wherein $R^1$ and $R^2$ are each ethyl and $R^3$ and $R^4$ are each dodecyl.

References Cited

UNITED STATES PATENTS 3,294,710  12/1966  Rosenberg et al. ____ 260—2.5

NICHOLAS S. RIZZO, Primary Examiner

R. V. RUSH, Assistant Examiner

U.S. Cl. X.R.

44—63, 72; 71—87; 252—77; 260—293.4, 326.61, 563, 576, 577, 583